(No Model.) 3 Sheets—Sheet 1.

F. H. VAN HOUTEN.
WOOD MOLDING MACHINE.

No. 558,005. Patented Apr. 7, 1896.

Witnesses:
H. E. N. Bates.
Thomas Durant

Inventor,
Frank H. VanHouten
By Church & Church
Attys.

(No Model.) 3 Sheets—Sheet 2.

F. H. VAN HOUTEN.
WOOD MOLDING MACHINE.

No. 558,005. Patented Apr. 7, 1896.

Witnesses:
N. E. Boland
Thos. Durant

Inventor.
Frank H. Van Houten
By Church & Church
Att'ys.

(No Model.) 3 Sheets—Sheet 3.

F. H. VAN HOUTEN.
WOOD MOLDING MACHINE.

No. 558,005. Patented Apr. 7, 1896.

Witnesses:
J. E. Bates
Thomas Durant

Inventor,
Frank H. Van Houten
By Church & Church
Atty's.

UNITED STATES PATENT OFFICE.

FRANK HENRY VAN HOUTEN, OF MATTEAWAN, NEW YORK.

WOOD-MOLDING MACHINE.

SPECIFICATION forming part of Letters Patent No. 558,005, dated April 7, 1896.

Application filed July 11, 1895. Serial No. 555,631. (No model.)

*To all whom it may concern:*

Be it known that I, FRANK HENRY VAN HOUTEN, of Matteawan, in the county of Dutchess and State of New York, have invented certain new and useful Improvements in Wood-Molding Machines; and I do hereby declare the following to be a full, clear, and exact description of the same, reference being had to the accompanying drawings, forming a part of this specification, and to the reference-numerals marked thereon.

My present invention relates to improvements in that class of wood-molding machines wherein an oscillatory reciprocating cutter-head is employed and caused to traverse the face of the material as the latter is advanced or fed by suitable mechanism to form a series of curves or other figures—such, for instance, as shown in Patent No. 480,443, granted me August 9, 1892, on which patented invention the present invention is an improvement; and it consists in the novel and improved mechanism for feeding or controlling the relative positions of the material and cutter-head while the former is being acted upon by the latter, all as will be hereinafter fully described, and the novel features pointed out particularly in the claims at the end of this specification.

Figure 1:
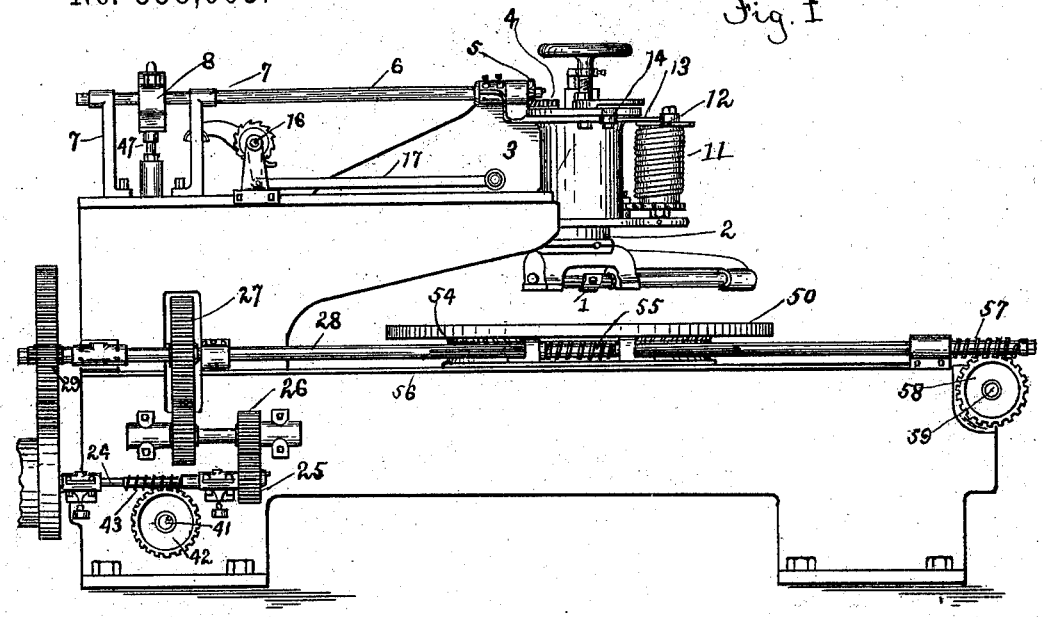
Figure 2:
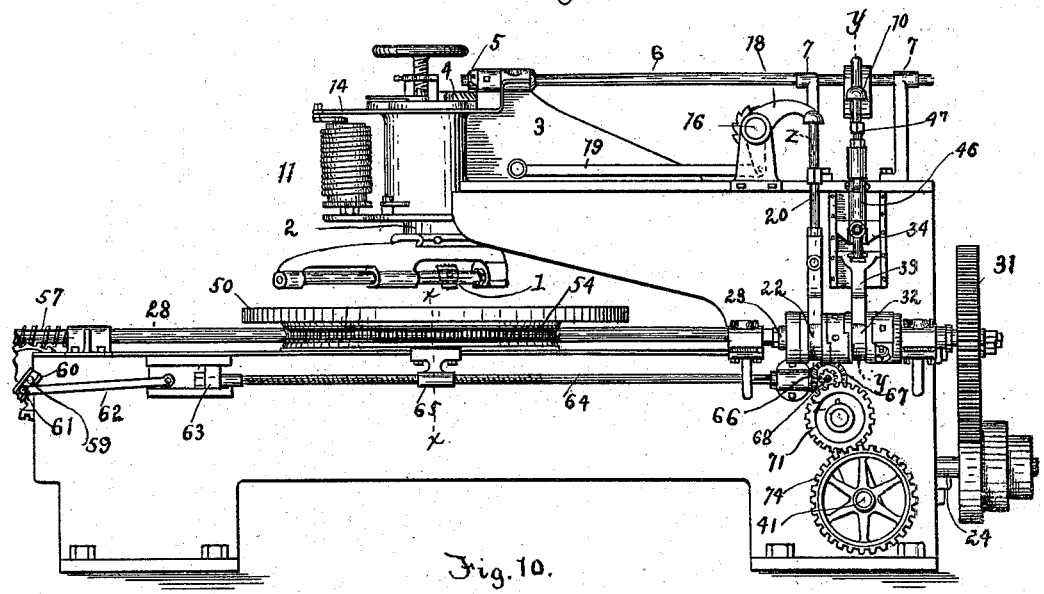
Figure 10:
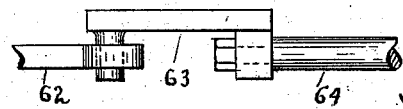
Figure 3:
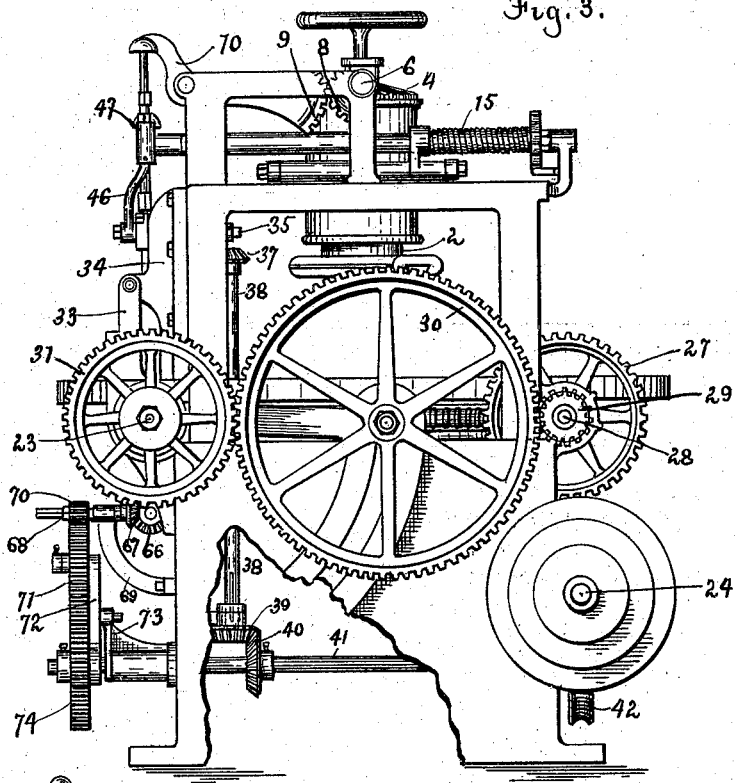
Figure 8:
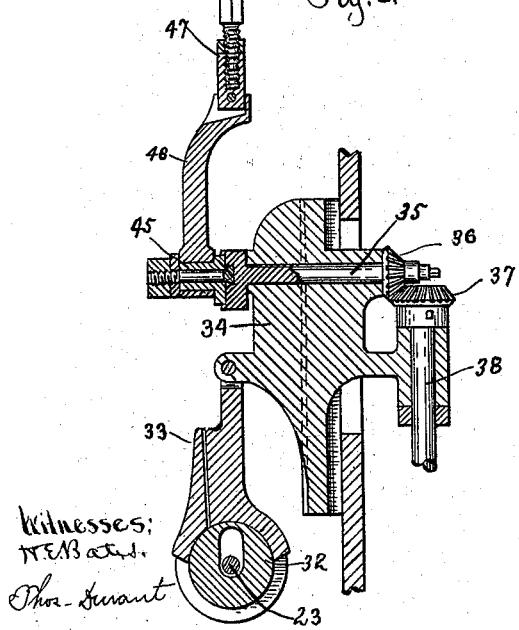
Figure 9:
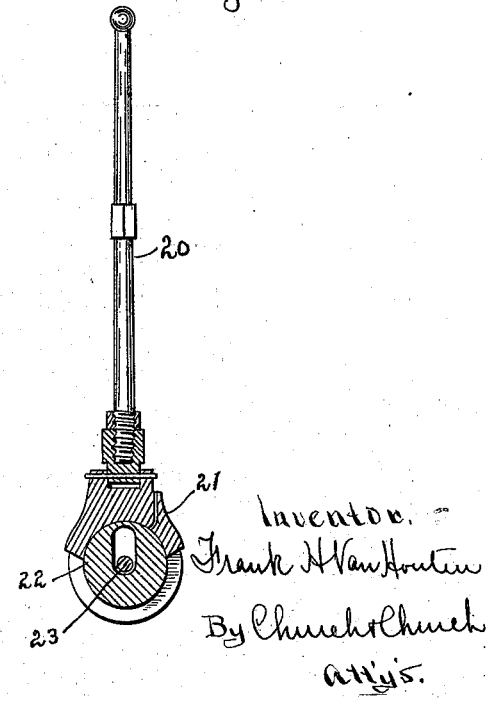
Figure 4:
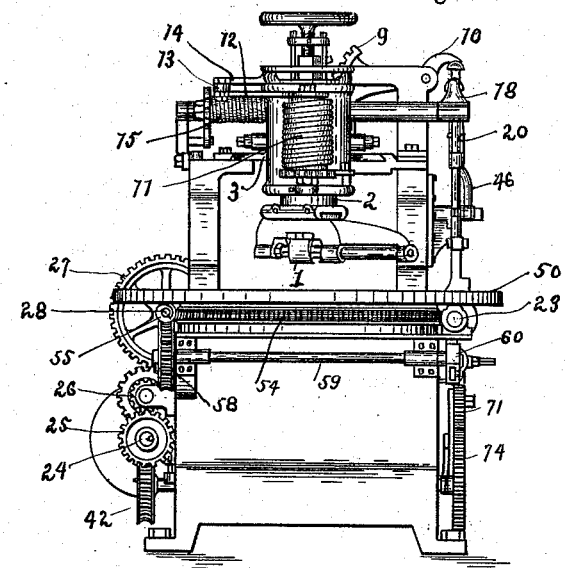
Figure 5:
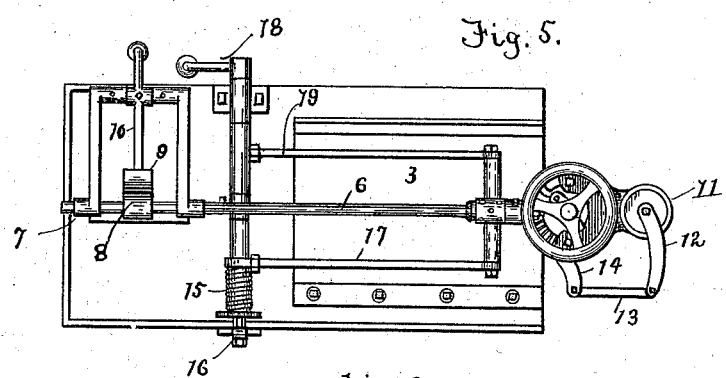
Figure 6:
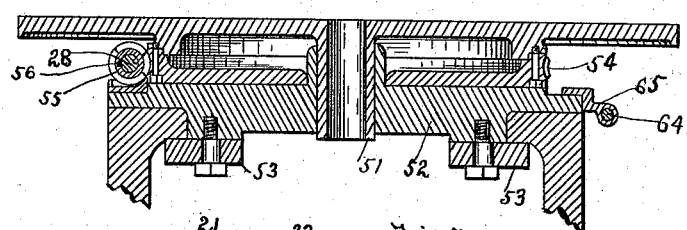
Figure 7:
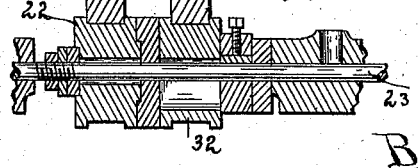

In the accompanying drawings, Figure 1 is a side elevation of a machine constructed in accordance with my present invention; Fig. 2, a similar view of the other side; Fig. 3, a rear end elevation; Fig. 4, a front end elevation; Fig. 5, a plan view of a portion of a machine; Fig. 6, a sectional view on the line $xx$ of Fig. 2; Fig. 7, a sectional view of the adjustable cam; Fig. 8, a section on the line $yy$ of Fig. 2; Fig. 9, a section on the line $zz$ of Fig. 2; Fig. 10, a detail view.

Similar reference-numerals indicate similar parts.

The cutting mechanism is of the type or variety in which a rotating cutter 1 is supported upon an oscillating frame or stem 2, attached to the reciprocating slide or carriage 3, and the oscillating movements of the frame or stem 2 are produced through gears 4 and 5, the latter arranged upon a shaft 6, supported in bearings 7, having a pinion 8 thereon engaging a segmental rack 9, attached to a lever 10, the outer end of which is moved vertically for causing the movement of the slide in one direction by means presently described. The oscillating movement of the head in the other direction is caused by a spring 11, operating through an arm 12, link 13, and arm 14 on the head, as shown particularly in Figs. 1, 4, and 5.

The slide 3 is moved longitudinally in one direction in suitable guides on the main frame by a spring 15, arranged on a transverse arbor 16 and connected by a link 17 with said frame, and in the opposite direction by an arm 18 on said arbor 16, which latter is connected by a link 19 with the frame, the construction being such that the spring 15 will hold the end of the lever 18 pressed upon the end of a thrust-rod 20, having a strap 21, resting on an adjustable cam 22 on a shaft 23.

Motion is transmitted to the shaft 23 from the main driving-shaft 24 by gears 25 26 27, shaft 28, pinion 29, and gears 30 and 31, the latter secured to the shaft 23, as shown in Figs. 1 and 3. Secured to the shaft 23 is an adjustable eccentric cam 32, upon which rests a strap 33, pivoted to a slide 34, movable vertically by said cam in guides secured to the side of the main frame of the machine, and passing transversely through this slide is an arbor 35, provided on its inner end, inside the frame, with a beveled pinion 36, meshing with a corresponding pinion 37 on the end of the shaft 38, supported in said slide, with its lower end passing through and splined to a pinion 39, supported in a bearing on the main frame and driven from a beveled pinion 40, secured to a shaft 41, passing transversely through the machine and provided on its outer end with a worm-wheel 42, operated by a worm 43 from the main driving-shaft 44.

Mounted upon the outer end of the arbor 35 in the slide 34 is an adjustable crank-pin 45, embraced by a strap on the lower end of a pitman 46, to the upper end of which is pivoted an adjustable thrust-rod 47, coöperating with the outer end of the lever 10, causing the oscillatory motion of the stem carrying the cutter-head.

From the above it will be seen that when the machine is operated the rotation of the shaft 23, carrying the adjustable eccentrics 32 and 22, will cause the back-and-forth movement of the stem carrying the cutter-head through the thrust-rod 20 operating on the lever 18, and also that the slide 34 will be moved vertically, carrying the arbor 35 and operating on the lever 10 through the thrust-rod 47, and also that the thrust-rod 47 will be given a varying movement through the crank-pin 45 on the arbor 35, which is operated through the shafts 41 and 38, the necessary movement of the latter shaft in the pinion 39 being permitted by reason of the splined connection between them, as shown in Fig. 3.

Machines of this kind as generally constructed have been provided with feeding mechanisms for advancing the material in a straight line beneath the cutter, and the result has been that the successive figures produced by the action of the oscillatory reciprocating cutter were all formed in the same plane—that is, if the actuating devices were set to produce a given figure each succeeding figure in the series would be in the same plane as compared with the other figures.

One object of the present invention is to enlarge the capacity of the machine, so that the successive figures may be formed in curved or spiral lines, and this is accomplished by shifting the position of the material—that is, changing or varying the line of feed motion—while the oscillatory reciprocating cutter is in action and operating to produce the given figure.

With the object in view of producing a great number of variations in the movement of the material being operated upon I provide a bed-plate or work-support 50, pivoted by a depending sleeve 51 at the center upon a reciprocating carriage 52, sliding on the main frame of the machine and held in position by plates or gibs 53. The bed-plate 50 is further provided with a worm-wheel 54, with which engages a worm 55, supported in suitable bearings on the carriage 52, and through this worm passes the shaft 28, connected to it by a spline or feather 56, operating to rotate the worm, and through it the bed-plate 50. The outer end of the shaft 28 is provided with a worm 57, meshing with a worm-wheel 58 on the end of a shaft 59, passing transversely across the end of the machine, and upon the other end of this shaft 59 is a slotted crank-arm 60, in which is secured an adjustable block carrying a crank-pin 61, to which is pivoted a pitman 62, connected at its other end to a slide 63, operating in guides on the main frame. Swiveled to this slide 63 is one end of a threaded shaft 64, passing through a threaded sleeve 65, secured to the carriage 52, as shown in Figs. 2 and 6, so that when the shaft 28 is rotated not only will the work-support 50 be rotated through the worm 55, but by reason of the connection just described the carriage will be given a slight reciprocating motion on its ways, depending for its amplitude on the distance the crank-pin 61 is moved from the center of the shaft 59. By placing the crank-pin 61 on the center of rotation of the shaft 59 the bed-plate 50 will be rotated, through the parts described, upon its axis, carrying the material in a curved or circular path beneath the oscillatory reciprocating cutter, so that the successive figures will be formed on a curved base-line, and, as the movements of the table are controlled by the same driving mechanism which controls the movements of the cutter, the several successive figures will all be of the same form and dimensions. When the crank-pin 61 is moved off the center of rotation, the carriage on which the bed-plate 50 is supported will be moved back and forth, and the figures formed by the cutter will not be on the same curved base-line, but alternately on one or the other side thereof.

For the purpose of causing the figures produced by the cutter to be arranged in spiral instead of on a concentric line or waved line, as described, I provide upon the end of the screw-shaft 64 a beveled gear 66, splined to the shaft and permitting the longitudinal movement thereof, and engage with this a beveled pinion 67, connected to the end of a stud-shaft 68, supported in a bracket 69, secured to the main frame. This shaft 68 is provided with a squared end, to which a handle may be applied for adjusting the bed-plate by hand, if necessary, and it is also provided with a pinion 70, through which motion from the driving mechanism of the machine may be transmitted to the screw-shaft. The preferred means for this transmission is a gear 71 on a stud on a radius-arm 72, pivoted on the shaft 41 and adapted to be secured to a bracket 73, a gear 74 being secured to the shaft 41 and meshing with the gear 71 on the radius-arm.

When the machine is being operated to produce the figures in circles, the radius-arm is moved so that the gear 71 is out of mesh with the pinion 70; but when desired to produce the spiral figures it is moved so that the gears will intermesh and motion will be transmitted to the screw-shaft 64, as will be understood, this causing a progressive motion of the carriage and bed-plate toward the rear end of the machine.

If desired, a greater variation in the figures may be accomplished by putting all the operating parts in operative connection with the driving mechanism, thereby causing the oscillation and reciprocation of the cutter-head, varied by the eccentric on the arbor 35, and also the reciprocation, rotation, and the progressive movement of the work-support, through the gears 73, 74, &c.

It will be understood that an eccentric could be used in place of the adjustable crank-pin 45, if desired, these parts being the well-recognized equivalents of each other.

I claim as my invention—

1. In a molding-machine the combination with the work-support, the oscillatory stem and a rotary cutter-head thereon, of a reciprocating slide or carriage and connections between said carriage and the stem for oscillating the latter, a rotary crank interposed in said connections for varying the oscillation of the head caused by the movement of the slide, substantially as described.

2. In a molding-machine the combination with the work-support, the oscillating stem and a rotary cutter-head thereon, of a reciprocating slide or carriage, a rotary crank thereon, and connections between said crank and the stem; whereby the latter may be oscillated and the amplitude of oscillation varied, substantially as described.

3. In a molding-machine the combination with the work-support, the oscillating stem and the rotary cutter-head thereon, and the reciprocating carriage for the stem, of a reciprocating slide or carriage, a rotary crank thereon and connections between said crank and the stem; whereby the latter may be oscillated and the amplitude of the oscillation varied, substantially as described.

4. In a molding-machine the combination with the oscillatory reciprocating cutter-head whose axis or arbor of rotation is transverse to its axis of oscillation and in a plane substantially parallel with the plane of reciprocation, of a work-support pivoted to turn about an axis substantially parallel with the axis of oscillation of the cutter-head, a base or support on which the work-support is guided and means for reciprocating said base in a plane substantially parallel with the plane of reciprocation of the cutter-head, substantially as described.

5. In a molding-machine, the combination with the oscillatory reciprocating cutter-head whose axis or arbor of rotation is transverse to its axis of oscillation and in a plane substantially parallel with the plane of reciprocation, of a work-support pivoted to turn about an axis substantially parallel with the axis of oscillation of the cutter-head, a base or support on which the work-support is guided, means for reciprocating said base in a plane substantially parallel with the plane of reciprocation of the cutter-head, and other means for causing a progressive movement of the base in a similar plane, substantially as described.

6. In a molding-machine, the combination with the oscillatory reciprocating cutter-head, of the movable base or support, the work-support pivoted thereon having the worm-wheel, the worm on the base, of the driving-shaft, the rotary shaft having the adjustable crank-pin, and connections between the crank-pin and the movable base on which the work-support is mounted, substantially as described.

7. In a molding-machine, the combination with the oscillatory reciprocating cutter-head, of the movable base or support, the work-support pivoted thereon having the worm-wheel, the worm on the base and the driving-shaft, the rotary shaft having the adjustable crank-pin, the screw connected to the crank-pin, and engaging a corresponding nut on the base and means for rotating said shaft and the screw, substantially as described.

8. In a molding-machine, the combination with the oscillatory reciprocating cutter-head, of the movable base or support, the work-support pivoted thereon and means for rotating it, the rotary shaft having the adjustable crank-pin, the slide to which it is connected, the screw connected to the slide and engaging the base and detachable connections between the screw and driving mechanism, substantially as described.

9. In a molding-machine, and as a means for governing the movement of a stem carrying a rotary cutter-head, the combination with a movable slide, and an eccentric for moving said slide, of an adjustable rotary crank mounted on the slide and connections between said crank and the cutter-head stem, substantially as described.

10. In a molding-machine, the combination with the main frame, the slide mounted thereon having the rotary arbor and gears, of the adjustable crank on the slide, and the pitman connected thereto for actuating a cutter-head, the rotary shaft having the adjustable eccentric for actuating the slide, and a sliding connection between the gears on the slide and a driving-shaft, substantially as described.

FRANK HENRY VAN HOUTEN.

Witnesses:
JOHN F. SCHLOSSER,
ISABELLA WILSON.